United States Patent
Zhang et al.

(10) Patent No.: US 10,191,320 B2
(45) Date of Patent: Jan. 29, 2019

(54) FILTER SHEET, MANUFACTURING METHOD THEREOF AND DISPLAY DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventors: Hongshu Zhang, Beijing (CN); Xibin Shao, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 734 days.

(21) Appl. No.: 14/355,369

(22) PCT Filed: Dec. 11, 2013

(86) PCT No.: PCT/CN2013/089124
§ 371 (c)(1),
(2) Date: Apr. 30, 2014

(87) PCT Pub. No.: WO2014/169671
PCT Pub. Date: Oct. 23, 2014

(65) Prior Publication Data
US 2015/0219958 A1    Aug. 6, 2015

(30) Foreign Application Priority Data
Apr. 16, 2013  (CN) .......................... 2013 1 0130924

(51) Int. Cl.
*G02F 1/1335* (2006.01)
*G02B 27/14* (2006.01)
(Continued)

(52) U.S. Cl.
CPC ........ *G02F 1/133514* (2013.01); *B32B 37/18* (2013.01); *B32B 38/0004* (2013.01);
(Continued)

(58) Field of Classification Search
CPC ................................. G02F 1/133514
See application file for complete search history.

(56) References Cited

U.S. PATENT DOCUMENTS

| 5,822,029 A | 10/1998 | Davis et al. |
| 6,451,414 B1 | 9/2002 | Wheatley et al. |

(Continued)

FOREIGN PATENT DOCUMENTS

| CN | 1285922 A | 2/2001 |
| CN | 1573466 A | 2/2005 |

(Continued)

OTHER PUBLICATIONS

First Chinese Office Action dated Dec. 3, 2014; Appln. No. 201310130924.9.
(Continued)

*Primary Examiner* — Dennis Y Kim
(74) *Attorney, Agent, or Firm* — Ladas & Parry LLP

(57) ABSTRACT

A filter sheet, a manufacturing method thereof and a display device are disclosed. The filter sheet includes: a first medium film, a second medium film and a third medium film attached to each other, wherein the filter sheet comprises a first pixel region, a second pixel region and a third pixel region; a portion of the first medium film in the first pixel region of the filter sheet is removed, a portion of the second medium film in the second pixel region of the filter sheet is removed, and a portion of the third medium film in the third pixel region of the filter sheet is removed; the first medium film reflects light in a first wavelength range and transmits light outside the first wavelength range; the second medium film reflects
(Continued)

light in a second wavelength range and transmits light outside the second wavelength range; and the third medium film reflects light in a third wavelength range and transmits light outside the third wavelength range.

18 Claims, 2 Drawing Sheets

(51) Int. Cl.
*B32B 38/00* (2006.01)
*G02B 5/20* (2006.01)
*B32B 37/18* (2006.01)
*G02B 5/28* (2006.01)
*B32B 38/10* (2006.01)

(52) U.S. Cl.
CPC .......... *B32B 38/0008* (2013.01); *G02B 5/201* (2013.01); *G02B 5/286* (2013.01); *G02B 27/141* (2013.01); *G02F 1/133516* (2013.01); *B32B 38/10* (2013.01); *B32B 2307/402* (2013.01); *B32B 2310/0843* (2013.01); *B32B 2551/00* (2013.01); *G02F 2001/133521* (2013.01); *G02F 2203/02* (2013.01); *Y10T 156/1064* (2015.01)

(56) References Cited

U.S. PATENT DOCUMENTS

| | | | |
|---|---|---|---|
| 7,063,890 | B2 | 6/2006 | Toda et al. |
| 2002/0113921 | A1* | 8/2002 | Jiang ............... B82Y 15/00 349/96 |
| 2003/0081156 | A1* | 5/2003 | Creemers ............... G02B 5/201 349/106 |
| 2004/0257541 | A1* | 12/2004 | Iisaka ............... G02B 5/201 353/84 |
| 2007/0177272 | A1* | 8/2007 | Benson ............... B32B 27/28 359/584 |
| 2007/0247567 | A1* | 10/2007 | Sato ............... G02B 5/286 349/96 |
| 2008/0297530 | A1* | 12/2008 | Ramstad ............... G09G 3/003 345/589 |
| 2011/0031517 | A1* | 2/2011 | Huang ............... H01L 29/78633 257/98 |
| 2011/0116010 | A1* | 5/2011 | Nagata ............... G02B 6/005 349/62 |
| 2012/0242565 | A1* | 9/2012 | Noh ............... G02F 1/167 345/107 |
| 2014/0285753 | A1* | 9/2014 | Nagato ............... G02F 1/133514 349/96 |

FOREIGN PATENT DOCUMENTS

| | | |
|---|---|---|
| CN | 1582410 A | 2/2005 |
| CN | 1996063 A | 7/2007 |
| CN | 103235356 A | 8/2013 |
| KR | 1020110085721 A | 7/2011 |
| KR | 1020120075827 A | 7/2012 |

OTHER PUBLICATIONS

International Search Report dated Mar. 20, 2014; PCT/CN2013/089124.

Jiyeon Kim; "One-step electrochemical deposition of $Cu_2ZnSnS_4$ thin film solar cells", Article of Sungkyunkwan University 2012; Published Date: Jun. 2012; 4 pages.

Second Chinese Office Action Appln. No. 201310130924.9; dated May 19, 2015.

Yan Qiurong et al; "The Design of periodic gradient-index optical thin film and analysis of spectral characteristics", Optical Instruments, Oct. 2009, vol. 31 No. 5 pp. 72-77.

International Preliminary Report on Patentability Appln. No. PCT/CN2013/089124; dated Oct. 20, 2015.

Third Chinese Office Action Appln. No. 201310130924.9; dated Nov. 4, 2015.

* cited by examiner

FILTER SHEET, MANUFACTURING METHOD THEREOF AND DISPLAY DEVICE

TECHNICAL FIELD

Embodiments of the present invention relate to a filter sheet, a manufacturing method thereof and a display device.

BACKGROUND

A color filter substrate is a critical component for achieving the color display of a flat panel display. As the flat panel display, a liquid crystal display is not a self-luminous display in that an internal backlight module or external environment light is needed to provide light, a driving circuit and a driving control to liquid crystal are then combined to form a gray scale display, and then the light is transmitted through red (R), green (G) and blue (B) color filters on the color filter substrate so as to form a color display picture.

The color filter substrate mainly comprises a glass substrate, a black matrix, a color filter, a protection layer, a transparent conductive film. The red (R), green (G) and blue (B) color filters are formed by coating a colored agent, and the pixels are spaced apart from each other by the black matrix. The mechanism employed by the color filter in prior art is absorbing-type, in which the color filter for one color will only permit the visible light with one certain color to pass through, and the visible light with other colors is absorbed. For example, the red color filter will only permit red visible light to pass through, and other visible light is absorbed. Therefore, the transmittance of the visible light is low (only about 30%), and the availability of the incident light (or backlight) is also low. In addition, the temperature of the color filter will rise due to absorbing the remaining visible light.

SUMMARY

The embodiments of the present invention provide a filter sheet, a manufacturing method thereof and a display device by which the availability of incident light (backlight) is improved, and the conversion of the incident light (backlight) into the useless heat is avoided.

In one aspect, the embodiment of the present invention provides a filter sheet, comprising: a first medium film, a second medium film and a third medium film attached to each other, wherein the filter sheet comprises a first pixel region, a second pixel region and a third pixel region; a portion of the first medium film in the first pixel region of the filter sheet is removed, a portion of the second medium film in the second pixel region of the filter sheet is removed, and a portion of the third medium film in the third pixel region of the filter sheet is removed; the first medium film reflects light in a first wavelength range and transmits light outside the first wavelength range; the second medium film reflects light in a second wavelength range and transmits light outside the second wavelength range; and the third medium film reflects light in a third wavelength range and transmits light outside the third wavelength range.

In another aspect, the embodiment of the present invention provides a display device, comprising: an array substrate; and a color filter substrate, being opposite to the array substrate and comprising a filter sheet as above mentioned.

In still another aspect, the embodiment of the present invention provides a manufacturing method of a filter sheet, comprising: manufacturing a first medium film, a second medium film and a third medium film, respectively; removing a portion of the first medium film corresponding to a first pixel region, removing a portion of the second medium film corresponding to a second pixel region, and removing a portion of the third medium film corresponding to a third pixel region; and attaching the first, second and third medium films.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

A First Embodiment

The first embodiment of the present invention provides a filter sheet, the filter sheet comprises a first medium film, a second medium film, and a third medium film attached to each other; the filter sheet comprises a first pixel region, a second pixel region and a third pixel region, a portion of the first medium film in the first pixel region of the filter sheet is removed, a portion of the second medium film in the second pixel region of the filter sheet is removed, and a portion of the third medium film in the third pixel region of the filter sheet is removed. The first medium film reflects light in a first wavelength range and transmits light outside the first wavelength range; the second medium film reflects light in a second wavelength region, and transmits light outside the second wavelength range, and the third medium film reflects light in a third wavelength range and transmits light outside the third wavelength range.

Taking a conventional RGB (Red/Green/Blue) filter sheet as an example, the first wavelength range in the present embodiment is from 600 nm to 780 nm, the first medium film is a red medium film. The second wavelength range is from 480 nm to 600 nm, and the second medium film is a green medium film. The third wavelength range is from 390 nm to 480 nm, and the third medium film is a blue medium film.

In order to more fully understand the filter sheet according to embodiments of the present invention by those skilled in the art, taking the conventional RGB filter sheet as an example, the filter sheet according to the embodiments of the present invention will be described in detail.

Figure 1:
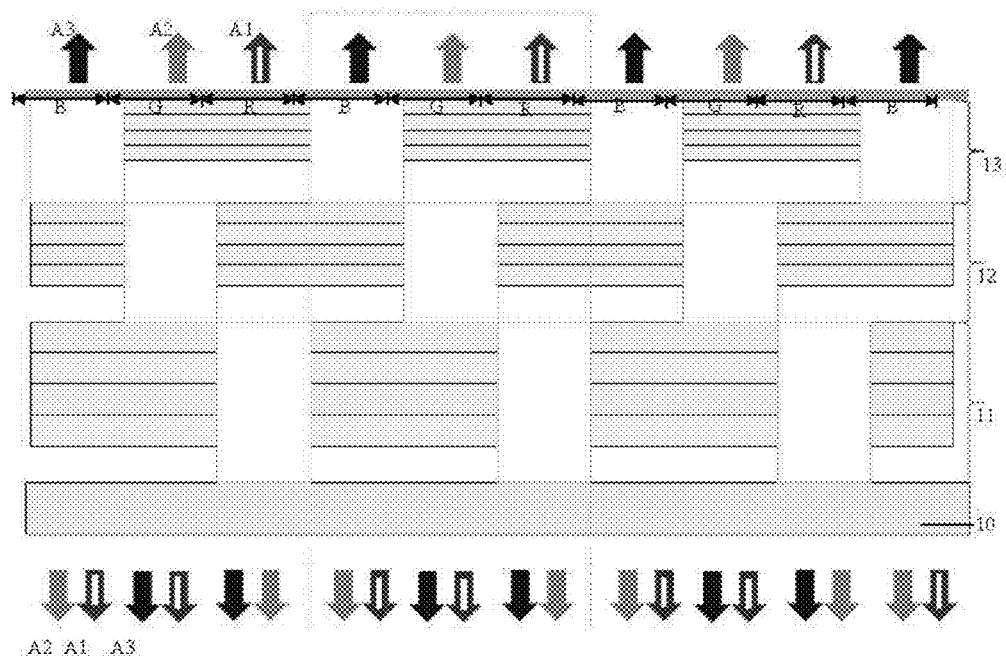
FIG. 1 is a schematic cross-sectional view showing a filter sheet according to a first embodiment of the present invention.

As shown in FIG. 1, the filter sheet comprises a red medium film 11, a green medium film 12 and a blue medium film 13 attached to each other, wherein the red medium film 11 reflects red visible light A1 (with a wavelength range of 600 nm to 780 nm), permits the remaining visible light (mainly comprising green visible light A2 and blue visible light A3) other than the red visible light to pass through, and in a region corresponding to a red pixel R of the filter sheet, the red medium film 11 is removed. The green medium film 12 reflects the green visible light (with a wavelength range of 480 nm to 600 nm), permits the remaining visible light (mainly comprising the red visible light A1 and the blue visible light A3) to pass through, and in a region corresponding to a green pixel G the green medium film is removed. The blue medium film 13 reflects the blue visible light (with a wavelength range of 390 nm to 480 nm), permits the remaining visible light (mainly comprising the red visible light A1 and the green visible light A2) to pass through, and in a region corresponding to a blue pixel B, the blue medium film is removed.

In the present embodiment, the filter sheet comprises the red medium film, the green medium film and the blue medium film attached to each other. Referring to the blue pixel B at a most left side, the blue medium film 13 needs to be removed in a region corresponding to the blue pixel B, thus there are only the red medium film 11 and the green medium film 13 in the region corresponding to the blue pixel B. When incident light or backlight (may be considered as three primary color light) is incident on the red medium film 11, the red visible light A1 is reflected, and the blue visible light A2 and the green visible light A3 are transmitted through, when then being incident on the green medium film 12, the green visible light is also reflected, and only the blue visible light A3 continuously passes through the region in which the blue medium film 13 is removed and is emitted. The same way is also for the red pixel R and the green pixel G.

In short, the blue visible light A3 is finally emitted from the region corresponding to the blue pixel B, and the green visible light A2 and the red visible light A1 are reflected; the green visible light A2 is finally emitted from the region corresponding to the green pixel G and the blue visible light A3 and the red visible light A1 are reflected; and the red visible light A1 is finally emitted from the region corresponding to the red pixel R and the green visible light A2 and the blue visible light A3 are reflected. The reflected light may be reused by being reflected again, thus the availability of light is improved and at the same time, the conversion into the useless heat from the incident light (backlight) is avoided.

Figure 2:
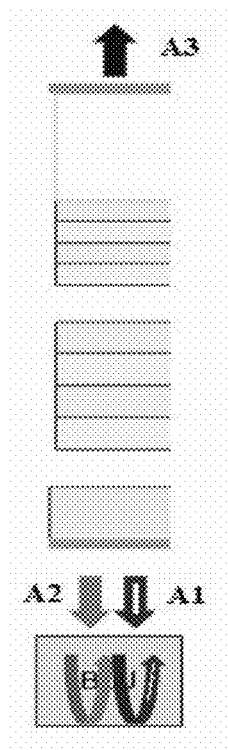
FIG. 2 is a schematic view showing a case in which backlight in a blue pixel region at a most left side of FIG. 1 is reused.

When the filter sheet is used in a flat panel display, its function is the same as a color filter on the color filter substrate. In a liquid crystal display as an example of the flat panel display, a backlight source generally comprises a prism film, a diffusion film, a reflection film and a protection film. As shown in FIG. 2, the light reflected by the filter sheet is further reflected by the reflection film in the backlight source, and is incident into a liquid crystal cell again so as to be reused, thus the availability of light is improved and at the same time, the conversion into the useless heat from the incident light (backlight) is avoided.

It is to be noted that a RGB color filter is a basic unit of the color filter substrate. Alternatively, there still are other color mixing solutions such as RGBY (red/green/blue/yellow), RGBW (red/green/blue/white). It is apparent to those skilled in the art that the technical solution according to the embodiment of the present invention can be applied to any other color mixing solution, without any creative effort, and all of these should fall within the protection scope of the embodiments of the present invention.

Exemplarily, for the RGBW color mixing solution, the filter sheet still comprises the red medium film, the green medium film, and the blue medium film attached to each other. In regions corresponding to the red, green and blue pixels, the filter sheet is performed the same removed treatment, but in a region corresponding to a white pixel (W), the red, green and blue medium films all are removed. For the RGBY color mixing solution, the filter sheet may comprise red, green, blue and yellow four medium films attached to each other, and reflection wavelength ranges corresponding to the red, green, blue and yellow four medium films will be redefined (that is, the reflection wavelength ranges corresponding to the four medium films will be redivided).

In addition, an attaching order of the first medium film, the second medium film and the third medium film will not influence on the technical effect of the embodiment of the present invention, thus the order is not limited in the present embodiment. In addition, each of the first, second and third medium films is relatively thin (about 50 to 100 micrometer), thus the first, second and third medium films are generally attached to a glass substrate 10.

Furthermore, the filter sheet may further comprise a black matrix region for separating the first pixel region, the second pixel region, and the third pixel region. In the black matrix region, the filter sheet reflects light in the first wavelength range, the second wavelength range and the third wavelength range.

Alternatively, the black matrix can be made separately as in the prior art, and then is attached to the filter sheet without a black matrix.

It is to be noted that when the filter sheet according to the embodiment of the present invention is used in a liquid crystal display device, the filter sheet may be provided between a light-exiting surface of the liquid crystal cell and an upper polarizer, or between a lower polarizer and an incident surface of the liquid crystal cell, or below the lower polarizer.

A Second Embodiment

A filter sheet may be implemented according to Bragg reflection in which medium layers with different refractive indices are stacked to form a reflection film. The Bragg reflection is a reflection in which a periodic reflection occurs when light is incident, as periodic reflection points are formed at an interface between two different mediums.

A relationship between a thickness of a certain medium layer and a reflection wavelength is $d=\lambda/4n$, where d is the thickness of the medium layer, $\lambda$ is a wavelength of light reflected by the medium layer, and n is a refractive index of the medium layer.

Figure 3:
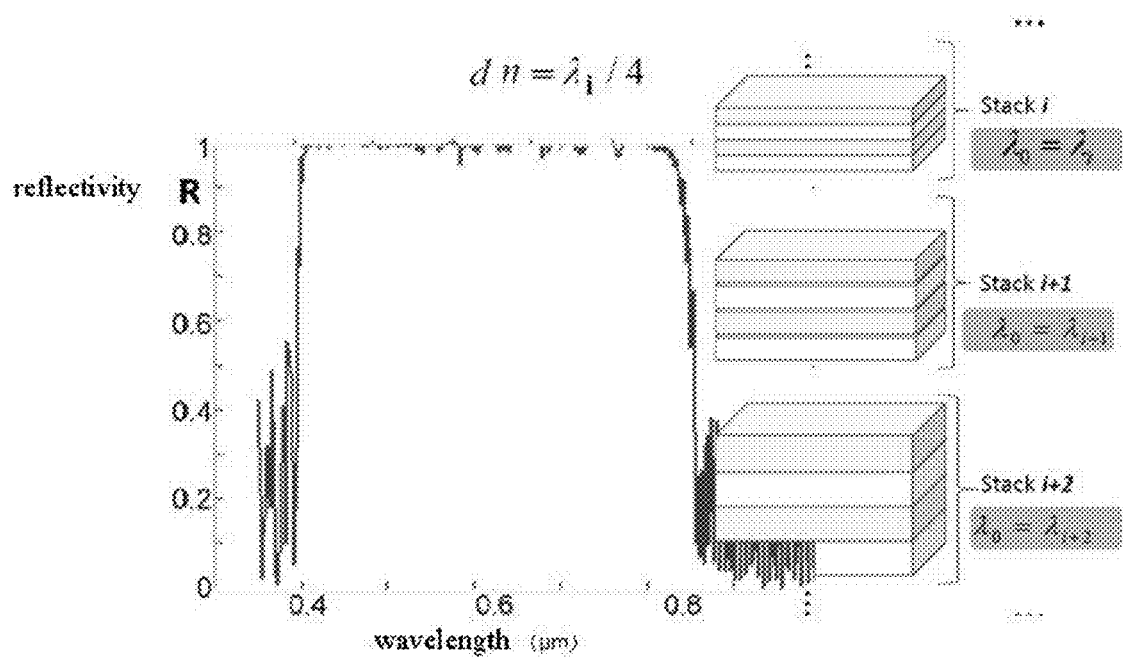
FIG. 3 is a schematic view showing a manufacturing principle of a medium film with wide reflection bandwidth according to a second embodiment of the present invention.

By changing the thickness d of the medium layer, the wavelength $\lambda$ of the light reflected by the medium layer is varied. By using a method of stacking a plurality of layers, medium layers with different thicknesses are stacked so that a medium film with wide reflection bandwidth is formed. As shown in FIG. 3, as the thickness of the medium layer is increased, the reflection bandwidth is superposed, and by selecting a multi-layer film, when the thickness of each layer is a certain value within a certain range (refer to a formula in the embodiment below), the full-waveband visible light can be reflected.

Exemplarily, each of the first medium film, the second medium film and the third medium film may comprise a plurality of cycles, each of the cycles is formed by alternately arranging a plurality of medium layers with different refraction indices, and the medium layers for each cycle may comprise two kinds, three kinds or even more kinds of medium layers. However, in view of a manufacturing process, by way of example, each of the cycles is formed by alternately arranging a low refractive index medium layer and a high refractive index medium layer, as shown in FIG. 1.

According to the Bragg reflection, given that a thickness of a first medium layer is $d_1$, a refractive index is $n_1$, and a wavelength of light reflected by the first medium layer is $\lambda_0$, then the relationship between the wavelength of the light reflected by the first medium layer and the thickness of the first medium layer is: $d_1 = X_\lambda/4n_1$;

If a difference between the wavelengths of the lights reflected by two adjacent medium layers is k (that is, the increasing coefficient below), then a thickness of a z-th medium layer satisfies a formula: $d_Z = \lambda_Z/4n_Z = [\lambda_0 + k(Z-1)]/4n_Z$, wherein $n_Z$ is the refractive index of the z-th medium layer and $\lambda_Z$ is the wavelength of the light reflected by the z-th medium layer.

Therefore, given that a fourth medium film is any medium film among the first, second and third medium films, a wavelength range for light reflected by the fourth medium film is $L_1 \sim L_2$. Along an incident light direction, if a low refractive index medium layer is arranged before a high refractive index medium layer, then in the fourth medium film:

a thickness of the low refractive index medium layer in a i-th cycle satisfies a formula: $d_{1i}[L_1+k(2i1-1-1)]/4n_1$, a thickness of the high refractive index medium layer in the i-th cycle satisfies a formula: $d_{2i}=[L_1+k(2i-1)]/4n_2$;

Along the incident light direction, if the low refractive index medium layer is arranged behind the high refractive index medium layer, then in the fourth medium film:

a thickness of the low refractive index medium layer in the i-th cycle satisfies a formula: $d_{2i}=[L_1+k(2i-1)]/4n_1$, a thickness of the high refractive index medium layer in the i-th cycle satisfies a formula: $d_{2i}=[L_1+k(2i-1-1)]/4n_2$;

Wherein k is the increasing coefficient, and $0.5 \geq k \geq 16$, i is a natural number and $0 < i \geq Z/2$, Z is the total number of the medium layers with the low refractive index and the medium layers with the high refractive index in the fourth medium film, $n_1$ is the refractive index of the medium layers with the low refractive index and $n_2$ is the refractive index of the high refractive index medium layer, the increasing coefficient corresponds to the difference between the wavelengths of the lights reflected by two adjacent medium layers and is related with the total number of the medium layers with the low refractive index and the medium layers with the high refractive index in the fourth medium film, for example, $k=(L_2-L_1)/(Z-1)$.

In order to enable those skilled in the art to fully understand the filter sheet according to the embodiments of the present invention, a thickness of each of the medium layers of the filter sheet according to the embodiment of the present invention will be described in detail hereinafter, wherein the filter sheet comprises a R sub-region, a G sub-region and a B sub-region, and is formed by red, green and blue medium films attached to each other and each of cycles of the red, green, or blue medium film is formed by alternately arranging a low refractive index medium layer and a high refractive index medium layer.

The more the number of the medium layers is, the better the reflection effect is. However, in consideration of a thickness of a liquid crystal panel, the number of the medium layers is from 200 to 400, for example. Below, taking the filter sheet comprising 400 medium layers as an example, wherein the blue medium film comprises 50 cycles, that is, 50 the low refractive index medium layers and 50 the high refractive index medium layers, 100 medium layers in total; the green medium film comprises 60 cycles, that is, 60 the low refractive index medium layers and 60 the high refractive index medium layers, 120 medium layers in total; the red medium film comprises 90 cycles, that is, 90 the low refractive index medium layers and 90 the high refractive index medium layers, 180 medium layers in total.

Herein, with regard to the blue medium film of the filter sheet, thicknesses of the low refractive index medium layer and the high refractive index medium layer are as follows. Along the incident light direction, if the low refractive index medium layer is arranged before the high refractive index medium layer, then in the blue medium film:

a predetermined thickness of the low refractive index medium layer in a i-th cycle satisfies a formula: $d_{1i}=[390+k(2i-1-1)]/4n_1$; and a predetermined thickness of the high refractive index medium layer in the i-th cycle satisfies a formula: $d_{2i}=[390+k(2i-1)]/4n_2$.

If the low refractive index medium layer is arranged behind the high refractive index medium layer, then in the blue medium film:

a predetermined thickness of the low refractive index medium layer in a i-th cycle satisfies a formula: $d_{1i}=[390+k(2i-1)]/4n_1$; and a predetermined thickness of the high refractive index medium layer in the i-th cycle satisfies a formula: $d_{2i}=[390+k(2i-1-1)]/4n_2$, Herein, i is a natural number, and $0 < i \leq 50$, $n_1$ is the refractive index of the low refractive index medium layer, $n_2$ is the refractive index of the high refractive index medium layer, k is the incremental coefficient, that is, the difference between the wavelengths of lights reflected two adjacent medium layers, and k=1.

Further, the green medium film of the filter sheet comprises 60 cycles, and in the incident light direction, if the low refractive index medium layer is arranged before the high refractive index medium layer, then in the green medium film:

a thickness of the low refractive index medium layer in a j-th cycle satisfies a formula: $d_{1j}=[480+k(2j-1)-1]/4n_1$;

a thickness of the high refractive index medium layer in the j-th cycle satisfies a formula: $d_{2j}=[480+k(2j-1)]/4n_2$.

If the low refractive index medium layer is arranged behind the high refractive index medium layer, then in the green medium film:

a thickness of the low refractive index medium layer in a j-th cycle satisfies a formula: $d_{1j}[480+k(2j-1)]/4n_1$, a thickness of the high refractive index medium layer in the j-th cycle satisfies a formula: $d_{2j}=[480+k(2j-1-1)]/4n_2$, wherein j is a natural number, and $0 < j \leq 60$, $n_1$ is the refractive index of the low refractive index medium layer, $n_2$ is the refractive index of the high refractive index medium layer, and the increasing coefficient k is $1 \leq k \leq 2$.

Further, the red medium film in the filter sheet comprises 90 cycles, and in the incident light direction, if the low refractive index medium layer is arranged before the high refractive index medium layer, then in the red medium film:

a thickness of the low refractive index medium layer in a N-th cycle satisfies a formula: $d_{1N}=[600+k(2N-1-1)]/4n_1$, and a thickness of the high refractive index medium layer in the N-th cycle satisfies a formula: $d_{2N}=[600+k(2N-1)]/4n_2$.

If the low refractive index medium layer is arranged behind the high refractive index medium layer, then in the red medium film:

a thickness of the low refractive index medium layer in the N-th cycle satisfies a formula: $d_{1N}=[600+k(2N-1)]/4n_1$, and a thickness of the high refractive index medium layer in the N-th cycle satisfies a formula: $d_{2N}=[600+k(2N-1-1)]/4n_2$, wherein N is a natural number, and $0<N\leq90$, $n_1$ is the refractive index of the low refractive index medium layer, $n_2$ is the refractive index of the high refractive index medium layer, and the increasing coefficient k is $1\leq k\leq2$.

Exemplarily, a difference between the refractive index of the low refractive index medium layer and the refractive index of the high refractive index medium layer is larger than or equal to 0.2. If the difference is too small, then the reflection effect is not sufficient and more layers are needed. Exemplarily, the low infraction index medium layer in the present embodiment is made of poly-terephthalic plastic with the refractive index of 1.57. The high refractive index medium layer is made of poly-terephthalic plastic with the refractive index of 1.82. Now, taking the blue medium film as an example, the specific calculation process of the thickness of each of the medium layers is described in detail:

A thickness of a first medium layer (the low refractive index medium layer in a first cycle) is: $d_1[390+(2i-1)-1]/4n_1=[390+(2*1-1)-1]/(4*1.57)=62.10$ nm;

A thickness of a second medium layer (the high refractive index medium layer in the first cycle) is: $d_2=[390+(2i)-1]/4n_2=[390+(2*1)-1]/(4*1.82)=53.71$ nm;

A thickness of a third medium layer (the low refractive index medium layer in a second cycle) is 62.42 nm;

A thickness of a fourth medium layer (the high refractive index medium layer in the second cycle) is 53.98 nm;

. . . ;

Up to a thickness of a Z-th medium layer is $d_Z=[390+Z-1]/4n_X$, $n_X$ is the refractive index of the Z-th medium layer, and the increasing coefficient k=1.

The thickness of each of the medium layers is gradually increased in a layer sequential manner, and the wavelength of the reflected light is gradually increased in a layer sequential manner, a change rule of the wavelength of the reflected light is $\lambda_Z=390+1*(Z-1)$. Correspondingly, the wavelength range (reflection bandwidth) of the light reflected by the blue medium film comprising a 1-st medium layer, a 2-th medium layer . . . a 100-th medium layers is 390 nm~489 nm. Of course, in an alternative embodiment, the reflection bandwidth of the blue medium film can be strictly limited into 390 nm~480 nm by adjusting the number of the medium layers or by adjusting the increasing coefficient k.

For the red medium film and the green medium film, the calculation process of the thickness for each of the medium layers is similar except that formulas used for the red and green medium films are different, and the details will not be described further.

According to the above thickness incremental rule, the two medium layers, i.e. the low refractive index medium layer and the high refractive index medium layer are arranged alternately, to form the red, green and blue medium films. Then, a region of the red medium film corresponding to a red pixel, a region of the green medium film corresponding to a green pixel and a region of the blue medium film corresponding to a blue pixel are removed by laser, and the obtained red, green and blue medium films are attached together to form the filter sheet according to the present embodiment of the present invention.

Optionally, material for the medium layer comprises organic material such as poly-terephthalic material; or, the material for the medium layer comprises oxide or nitride material such as titanium dioxide, silicon dioxide, titanium oxide, aluminum oxide, silicon nitride.

Exemplarily, the poly-terephthalic organic material comprises polyethylene terephthalate and polybutylene terephthalate.

Furthermore, the filter sheet may further comprise a black matrix region for separating the first pixel region, the second pixel region, and the third pixel region. In the black matrix region, the filter sheet reflects light in the first wavelength range, the second wavelength range and the third wavelength range.

Alternatively, the black matrix can be made separately as in the prior art, and then is attached to the filter sheet without a black matrix.

With the filter sheet according to the embodiment of the present invention, in the pixel region (for example, the red, green and blue pixel regions), the unnecessary visible light is reflected back to be used again, rather than be absorbed, thus the availability of light is improved and at the same time, the conversion into the useless heat from the incident light (backlight) is avoided.

A Third Embodiment

The third embodiment of the present invention also provides a color filter substrate comprising any filter sheet as described in the first and second embodiments.

A position of the filter sheet does not influence on the technical effect of the embodiment of the present invention, and thus there is no limitation to this, only for a convenience in a manufacturing process. Exemplarily, the filter sheet is provided at a back surface of the substrate, and the other surface (front surface) of the substrate is formed with a black matrix, a protection layer, a transparent conductive film and so on by using a known method by the inventor. A step of applying a colored agent to form a color filter layer is omitted.

The embodiment of the present invention further provides a display device provided with the color filter substrate as above described or the filter sheet according to the first or second embodiment.

Exemplarily, the display device is a liquid crystal display device and comprises: a backlight source, a liquid crystal cell, a polarizer and so on, wherein the filter sheet is attached between a light-exiting surface of the liquid crystal cell and the polarizer. The backlight source generally comprises a prism film, a diffusion film, a reflection film and a protection film, and light reflected by the filter sheet is further reflected by the reflection film in the backlight source and incident into the liquid crystal cell to be reused, thus the availability of incident light (backlight) is improved, and the conversion of the incident light (backlight) into the useless heat is avoided.

A Fourth Embodiment

The embodiment of the present invention further provides a manufacturing method of a filter sheet, the method comprises:

101, manufacturing a first medium film, a second medium film and a third medium film, respectively, 102, removing a portion of the first medium film corresponding to a first pixel region, removing a portion of the second medium film corresponding to a second pixel region, and removing a portion of the third medium film corresponding to a third pixel region;

103, attaching the first medium film, the second medium film and the third medium film.

Optionally, each of the first medium film, the second medium film and the third medium film comprises a plurality of cycles, and each of the cycles is formed by alternately arranging a plurality of medium layers with different refractive indices.

Exemplarily, in a case that the filter sheet is formed by alternately arranging two medium layers, i.e. a low refractive index medium layer and a high refractive index medium layer, the manufacturing of the first medium film, the second medium film and the third medium film respectively comprises:

1011, forming the low refractive index medium layer with a predetermined thickness and the high refractive index medium layer with a predetermined thickness (refer to the second embodiment);

1012, alternately arranging the formed low refractive index medium layer and the formed high refractive index medium layer, then heating the resultant to 140 degree and pressing the same at 10 atmospheric pressure.

Optionally, the low refractive index medium layer is made of poly-terephthalic plastic with the refractive index of 1.57. The high refractive index medium layer is made of poly-terephthalic plastic with the refractive index of 1.82.

Optionally, a method used in the removing a portion of the first medium film corresponding to a first pixel region, removing a portion of the second medium film corresponding to a second pixel region, and removing a portion of the third medium film corresponding to a third pixel region, is a laser cutting method.

The embodiment of the present invention also provides a manufacturing method of a filter sheet. In the method, a first medium film, a second medium film a third medium film attached to each other is used to take the place of a conventional color filter, and the principle its is in that a transflective film reflecting light in a specific waveband can be made by stacking the medium films with different refractive indices (taking the RGB color mixing as example, forming red, green and blue medium films), at a place where red light needs to be transmitted through (a region corresponding to a red pixel), the medium film reflecting the red light is removed; at a place where green light needs to be transmitted through (a region corresponding to a green pixel), the medium film reflecting the green light is removed; and at a place where blue light needs to be transmitted through (a region corresponding to a blue pixel), the medium film reflecting the blue light is removed, so that the filter sheet having the same function as the conventional color filter is formed. Moreover, the light reflected by the filter sheet may be reflected again to be reused, thus the availability of incident light (backlight) is improved, and the conversion of the incident light (backlight) into the useless heat is avoided.

Although in the above description, a liquid crystal display device is taken as an example, it should be understood that the present invention is not limited thereto and can be applied to any other devices comprising a color filter, such as an OLED.

The embodiment of the invention being thus described, it will be obvious that the same may be varied in many ways. Such variations are not to be regarded as a departure from the spirit and scope of the invention, and all such modifications as would be obvious to those skilled in the art are intended to be included within the scope of the following claims.

The invention claimed is:

1. A filter sheet, comprising:
a first medium film, a second medium film and a third medium film attached to each other,
wherein the filter sheet comprises a first pixel region, a second pixel region and a third pixel region;
a portion of the first medium film in the first pixel region of the filter sheet is removed, a portion of the second medium film in the second pixel region of the filter sheet is removed, and a portion of the third medium film in the third pixel region of the filter sheet is removed;
the first medium film reflects light in a first wavelength range and transmits light outside the first wavelength range; the second medium film reflects light in a second wavelength range and transmits light outside the second wavelength range; and the third medium film reflects light in a third wavelength range and transmits light outside the third wavelength range, each of the first, second and third medium films comprises a plurality of cycles, and each of the cycles is formed by alternately arranging at least two medium layers with different refractive indices;
wherein a fourth medium film is a same one as any one of the first, second and third medium films, and a reflection wavelength range of the fourth medium film is from $L_1$ to $L_2$;
in an incident light direction, if the low refractive index medium layer is arranged before the high refractive index medium layer, then in the fourth medium film:
a thickness of the low refractive index medium layer in a i-th cycle satisfies a formula: $d_{1i}=[L_1+k(2i-1-1)]/4n_1$,
a thickness of the high refractive index medium layer in the i-th cycle satisfies a formula: $d_{2i}=[L_1+k(2i-1)]/4n_2$; and
in the incident light direction, if the low refractive index medium layer is arranged behind the high refractive index medium layer, then in the fourth medium film:
a thickness of the low refractive index medium layer in a i-th cycle satisfies a formula: $d_{1i}=[L_1+k(2i-1)]/4n_1$;
a thickness of the high refractive index medium layer in the i-th cycle satisfies a formula: $d_{2i}=[L_1+k(2i-1-1)]/4n_2$,
wherein k is an increasing coefficient and $0.5 \leq k \leq 16$, i is a natural number and $0 \leq i \leq Z/2$, Z is the total number of the low refractive index medium layer and the high refractive index medium layer in the fourth medium film, $n_1$ is a refractive index of the low refractive index medium layer, and $n_2$ is a refractive index of the high refractive index medium layer.

2. The filter sheet according to claim 1, wherein the first wavelength range is from 600 nm to 780 nm, the first medium film is a red medium film; the second wavelength range is from 480 nm to 600 nm, the second medium film is a green medium film; the third wavelength range is from 390 nm to 480 nm and the third medium film is a blue medium film.

3. The filter sheet according to claim 1, wherein each of the cycles in the first, second and third medium films is formed by alternately arranging a high refractive index medium layer and a low refractive index medium layer.

4. The filter sheet according to claim 3, wherein a difference between a refractive index of the high refractive index medium layer and a refractive index of the low refractive index layer is larger than or equal to 0.2.

5. The filter sheet according to claim 3, wherein a refractive index of the low refractive index medium layer is 1.0-1.8, and a refractive index of the high refractive index medium layer is 1.2-2.0.

6. The filter sheet according to claim 5, wherein the low refractive index medium layer is made of poly-terephthalic plastic with the refractive index of 1.57, and the high refractive index medium layer is made of poly-terephthalic plastic with the refractive index of 1.82.

7. The filter sheet according to claim 1, wherein material for the medium layer is organic material, oxide material or nitride material, and the organic material comprises poly-terephthalic material, the oxide material comprises titanium dioxide, silicon dioxide, titanium oxide and aluminum oxide, and the nitride material comprises silicon nitride.

8. The filter sheet according to claim 1, wherein the filter sheet further includes a black matrix region, the black matrix region separates the first pixel region, the second pixel region and the third pixel region, the filter sheet in the black matrix region reflects light in the first wavelength range, in the second wavelength range, and in the third wavelength range.

9. The filter sheet according to claim 1, wherein each of the first, second and third medium films has a thickness of 50-100 micrometer.

10. A display device, comprising:
an array substrate;
a color filter substrate, provided opposed to the array substrate and comprising the filter sheet according to claim 1.

11. The display device according to claim 10, wherein the display device is a liquid crystal display device comprising a backlight source, and the backlight source comprises a reflection film.

12. The display device according to claim 10, wherein the filter sheet is provided on a side of the color filter substrate opposite to the array substrate.

13. The display device according to claim 10, wherein the filter sheet is provided on a side of the color filter substrate facing the array substrate.

14. The filter sheet according to claim 1, wherein the filter sheet further comprises an attached fifth medium film, the filter sheet comprises a fifth pixel region corresponding to the fifth medium film, in the fifth pixel region, the fifth medium film is removed, and the fifth medium film reflects light in a fifth wavelength range and transmits light outside the fifth wavelength range.

15. The filter sheet according to claim 14, wherein the fifth medium film reflects yellow light.

16. The filter sheet according to claim 14, wherein the fifth medium film comprises a plurality of cycles, each of the cycles is formed by alternately arranging at least two medium layers with different refractive indices.

17. A manufacturing method of a filter sheet, comprising:
manufacturing a first medium film, a second medium film and a third medium film, respectively;
removing a portion of the first medium film corresponding to a first pixel region, removing a portion of the second medium film corresponding to a second pixel region, and removing a portion of the third medium film corresponding to a third pixel region; and
attaching the first, second and third medium films;
wherein a fourth medium film is a same one as any one of the first, second and third medium films, and a reflection wavelength range of the fourth medium film is from $L_1$ to $L_2$;
in an incident light direction, if the low refractive index medium layer is arranged before the high refractive index medium layer, then in the fourth medium film:
a thickness of the low refractive index medium layer in a i-th cycle satisfies a formula: $d_{1i}=[L_1+k(2i-1-1)]/4n_1$,
a thickness of the high refractive index medium layer in the i-th cycle satisfies a formula: $d_{2i}=[L_1+k(2i-1)]/4n_2$; and
in the incident light direction, if the low refractive index medium layer is arranged behind the high refractive index medium layer, then in the fourth medium film:
a thickness of the low refractive index medium layer in a i-th cycle satisfies a formula: $d_{1i}=[L_1+k(2i-1)]/4n_1$;
a thickness of the high refractive index medium layer in the i-th cycle satisfies a formula: $d_{2i}=[L_1+k(2i-1-1)]/4n_2$,
wherein k is an increasing coefficient and $0.5 \leq k \leq 16$, i is a natural number and $0 \leq i \leq Z/2$, Z is the total number of the low refractive index medium layer and the high refractive index medium layer in the fourth medium film, $n_1$ is a refractive index of the low refractive index medium layer, and $n_2$ is a refractive index of the high refractive index medium layer.

18. The method according to claim 17, wherein in the removing a portion of the first medium film corresponding to a first pixel region, removing a portion of the second medium film corresponding to a second pixel region, and removing a portion of the third medium film corresponding to a third pixel region, a laser cutting method is used.

* * * * *